US009713961B2

(12) United States Patent
Fan et al.

(10) Patent No.: US 9,713,961 B2
(45) Date of Patent: Jul. 25, 2017

(54) METHOD AND SYSTEM FOR CONTROL OF CONTACTOR

(71) Applicant: GM GLOBAL TECHNOLOGY OPERATIONS LLC, Detroit, MI (US)

(72) Inventors: Yue Fan, Ann Arbor, MI (US); Andrew J. Namou, West Bloomfield, MI (US); Andres V. Mituta, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 135 days.

(21) Appl. No.: 14/659,672

(22) Filed: Mar. 17, 2015

(65) Prior Publication Data

US 2016/0272076 A1 Sep. 22, 2016

(51) Int. Cl.
*H02J 7/00* (2006.01)
*B60L 11/18* (2006.01)

(52) U.S. Cl.
CPC ....... *B60L 11/1816* (2013.01); *B60L 2240/36* (2013.01); *B60L 2240/525* (2013.01); *B60L 2240/545* (2013.01); *B60L 2270/145* (2013.01); *Y02T 10/7005* (2013.01)

(58) Field of Classification Search
CPC ..................................................... Y02T 90/14
USPC .................................. 320/109, 118; 701/22
See application file for complete search history.

(56) References Cited

U.S. PATENT DOCUMENTS

| 2009/0277701 A1* | 11/2009 | Soma ..................... | B60K 6/445 180/65.25 |
| 2012/0013297 A1* | 1/2012 | Turner ................... | B60L 11/14 320/109 |
| 2012/0229057 A1* | 9/2012 | Ogawa ................ | B60L 11/1803 318/139 |
| 2013/0057219 A1* | 3/2013 | Sakata ................ | B60L 11/1866 320/118 |

* cited by examiner

*Primary Examiner* — Drew A Dunn
*Assistant Examiner* — Zixuan Zhou
(74) *Attorney, Agent, or Firm* — Quinn IP Law

(57) ABSTRACT

A method and system for controlling one or more contactors of a rechargeable energy storage system (RESS) includes adjusting, via a controller, the respective actuating power provided to a respective one or more of the contactors, where adjusting of the actuating power is defined by the energized or non-energized condition of the vehicle and at least one parameter affecting holding and opening forces exerted on the respective contactor. In an example, the controller is configured to use feed forward factors defined by the at least one parameter and to adjust the dynamic actuating current by modulating the dynamic actuating current at a pulse width modulation (PWM) frequency defined by a feed forward window. The system may be configured as a plug-in electric vehicle including the rechargeable energy storage system and the controller.

19 Claims, 2 Drawing Sheets

METHOD AND SYSTEM FOR CONTROL OF CONTACTOR

TECHNICAL FIELD

The disclosure generally relates to a method of controlling power to a contactor of a rechargeable energy storage system.

BACKGROUND

A plug-in electric vehicle (PEV) is a motor vehicle which includes a rechargeable energy storage system (RESS) including a rechargeable energy source such as a battery, a battery pack, a fuel cell, or a high voltage battery (HV battery), where the rechargeable energy source can be charged from an external power source, e.g., a source of electricity external to the PEV. The electrical energy stored in the rechargeable battery pack may be used in a PEV to power one or more electric motors that provide tractive torque to the powertrain of the vehicle, to propel the vehicle. Plug-in electric vehicles (PEV) include all-electric vehicles, battery electric vehicles (BEV), plug-in hybrid vehicles (PHEV), and electric vehicle conversions of hybrid electric vehicles (HEV) and conventional internal combustion engine vehicles.

The RESS typically includes one or more disconnecting switches, which may also be referred to as high voltage (HV) contactors, or contactors, which provide for the connection of the HV battery to one or more of the charger, inverter, DC/DC converter, and auxiliary high voltage loads such as heating and cooling loads, when the PEV is powered, and for the disconnection of the HV battery from the PEV system to isolate the HV battery from the PEV system when the PEV is not powered. The PEV may be powered, for example, when the PEV system is on or when the PEV is plugged in to an external power source for charging. The PEV is not powered, for example, when the PEV system is off and the HV battery is not being charged. When the PEV is powered, the HV contactors are typically energized at a static or nominal power level which may be a maximum power level for the HV contactor, to ensure that the HV contactor remains in a closed state when the HV current draw through the RESS is maximized, for example, under electric vehicle mode high power demand conditions.

Typically, HV contactors have been sized to be continuously powered at a static maximum power level, where the static maximum power level is the power level required to maintain the contactor solenoid in a closed position when blow-off electromagnetic force and Lorentz force is high, e.g., when the maximum HV current level is being drawn through the RESS, to ensure continuous closure of the contactor during the portion of time the HV current drawn approaches or is at the maximum HV current level and the electromagnetic blow-off force and Lorenz force opposing the closing force of the contactor are at their greatest magnitude. Continuously powering the contactor at the static maximum power level generates elevated temperature and heat at the contactor and at the contacts of the contactor while continuously consuming energy to maintain the static power level.

SUMMARY

A vehicle includes a controller in communication with a rechargeable energy storage system (RESS). The RESS includes a rechargeable energy source electrically connected to at least one contactor, where the at least one contactor is in electrical communication with the controller and is selectively actuable between an open state and a closed state by a dynamic actuating current provided by the controller. In the open state, electrical power is prevented from flowing through the at least one contactor and in the closed state, electrical power is flowable through the at least one contactor. A method for controlling actuating power to a contactor of a rechargeable energy storage system includes determining, via the controller, a condition of the vehicle including the rechargeable energy storage system (RESS), as one of an energized condition and a non-energized condition. The method further includes, when the vehicle condition is determined to be the non-energized condition, terminating the dynamic actuating current to the at least one contactor such that, with the dynamic actuating current terminated, the at least one contactor is in the open state.

The method includes, when the vehicle condition is determined to be in the energized condition, providing a present level of the dynamic actuating current to the at least one contactor. The present level of the dynamic actuating current is sufficient to actuate the at least one contactor to the closed state at the present time. The method further includes polling, via the controller, a parameter value of at least one parameter, where a change in the parameter value of the at least one parameter affects holding and opening forces exerted on the at least one contactor, and determining a feed forward factor for a predetermined feed forward window, where the feed forward factor is defined by the at least one parameter. The controller determines whether an adjustment to the present level of the dynamic actuating current is indicated by the feed forward factor and adjusts the dynamic actuating current from the present level to an indicated level when an adjustment to the dynamic actuating current is indicated. The indicated level of the dynamic actuating current is sufficient to maintain the at least one contactor in the closed state during the feed forward window.

The method further includes detecting, via the controller, a request to energize the rechargeable electrical storage system (RESS) from the non-energized condition, where the RESS includes a pre-charge contactor and a main positive contactor electrically connected in parallel to the rechargeable energy source. The controller, upon detecting the request to energize the RESS, actuates the pre-charge contactor to a closed state, then actuates the main positive contactor to a closed state. The main positive contactor is actuated to a closed state after the controller determines that the pre-charge contactor in the closed state has reached a predetermined threshold voltage. The controller actuates the main positive contactor to the closed state by providing the dynamic actuating current at a maximum actuating current limit predetermined for the main positive contactor. In one example, the vehicle in the non-energized condition is in a keyed-off condition, and the request to energize the RESS is one of a request generated by one of an external power source electrically connected to the RESS, a wake-up signal to initiate charging of the rechargeable energy source, a request to power-on the vehicle; and a vehicle key-on event.

In one example, the parameter may be the current draw through the at least one contactor. In one example, the energized condition is a vehicle operating condition and the at least one parameter includes a vehicle operating parameter, such that the at least one parameter may include one or more of a vehicle speed of the vehicle, a mode of operation of the vehicle such as a charge-depleting (CD) mode or a charge-sustaining (CS) mode, and at least one parameter defined by a shock force or vibration operating on the at least one contactor. In one example, the energized condition is an external charging condition and the at least one parameter includes an external charging parameter, such that the at least one parameter may include one or more of a state of charge (SOC) of the rechargeable energy source, a parameter defined by a current draw from the external power source selectively connected to the rechargeable energy source, and one or more temperature conditions within the RESS.

The controller may adjust the dynamic actuating current by modulating the dynamic actuating current at a pulse width modulation (PWM) frequency. The PWM frequency may be defined by the feed forward window. In one example, the feed forward window has a predetermined duration in a range of 12 to 25 milliseconds. In another example, the feed forward window has a predetermined duration of less than 12 milliseconds. The controller is configured to adjust the dynamic actuating current between a minimum power limit and a maximum power limit when the vehicle is in an energized condition, where the maximum power limit is less than a power rating of the at least one contactor and the minimum power limit is greater than a drop-out power level of the at least one contactor. The above features and advantages and other features and advantages of the present invention are readily apparent from the following detailed description of the best modes for carrying out the invention when taken in connection with the accompanying drawings.

DETAILED DESCRIPTION

Figure 1:
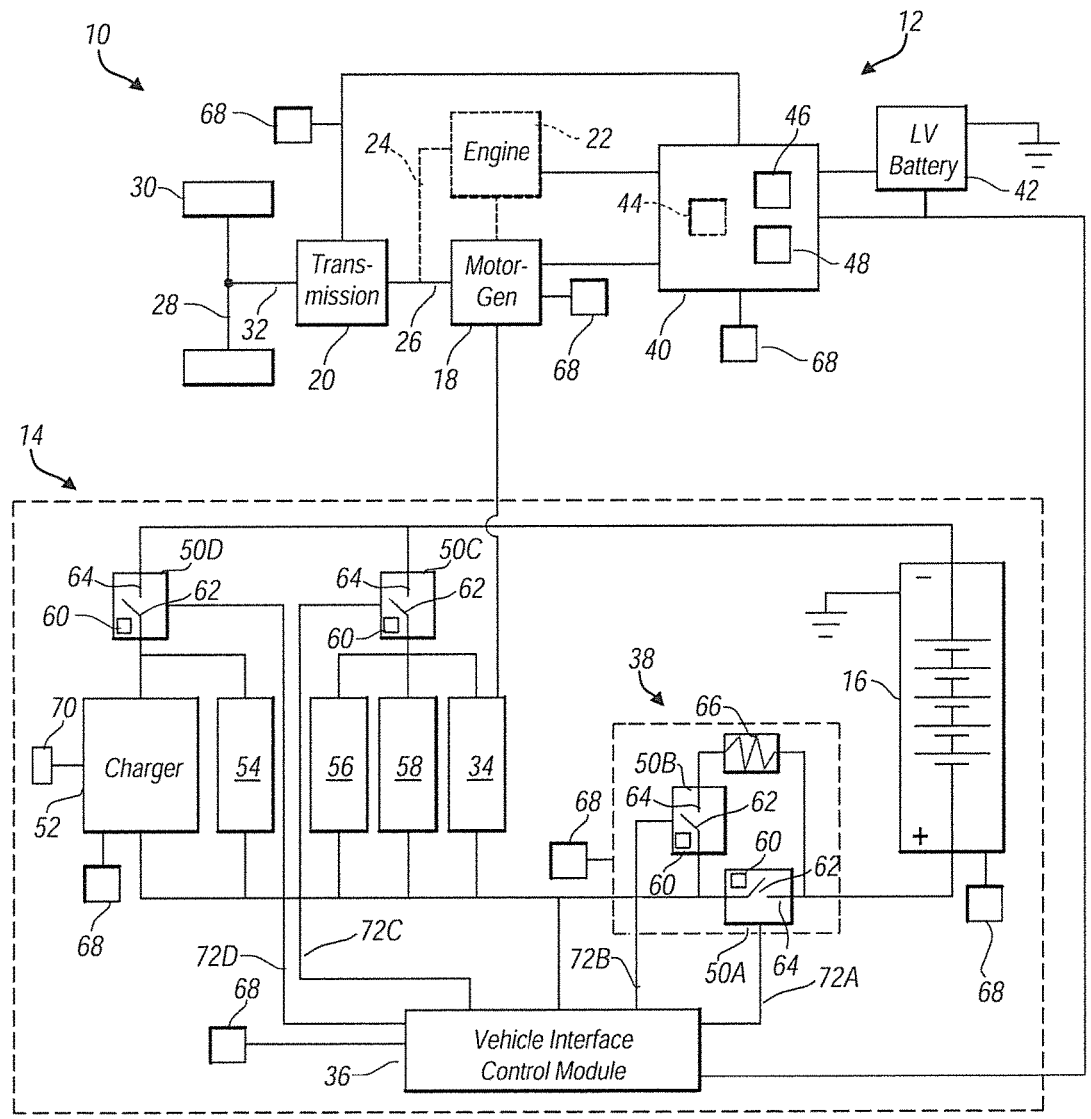
FIG. 1. is a schematic block diagram of an example system including a rechargeable energy storage system (RESS) having at least one contactor.

Referring to the drawings, wherein like reference numerals are used to identify like or identical components in the various views, FIG. 1 illustrates a plug-in electric vehicle (PEV) including an electrified powertrain 12 and a rechargeable energy storage system (RESS) 14 including a rechargeable energy source 16. The rechargeable energy source 16 may be configured, by way of example, as a high voltage (HV) battery, a battery pack or a fuel cell which can be recharged from an external source of electricity selectively connected to a plug-in electric vehicle (PEV) 10, and/or by an electric motor-generator 18 when the motor-generator 18 is operating in its capacity as a generator. By way of non-limiting example, the rechargeable energy source 16 is referred to herein as a high voltage (HV) battery. The electrical energy stored in the HV battery 16 may be used in the PEV 10 to power one or more electric motors, including, for example, the motor-generator 18 when the motor-generator 18 is operating in its capacity as a motor, to provide tractive torque to propel the vehicle 10. The PEV 10 in the example shown in FIG. 1 is configured as a hybrid electric vehicle (HEV). It would be understood that this example is non-limiting, and the PEV may be configured as a hybrid electric vehicle (HEV), a battery electric vehicle (BEV), an extended-range electric vehicle (EREV) or other electrified motor vehicle which includes a rechargeable energy storage system (RESS) including an HV battery 16.

The PEV 10 includes a transmission 20 connected to a fuel powered engine 22, which has an engine output shaft 24 operatively connected with an input shaft 26 of the transmission 20 for providing torque to the axle 28 of the driving wheels 30 via an output shaft 32 of the transmission 20. The transmission 20 can be any suitable transmission, so that the PEV 10 may be a full, mild or other design of HEV as desired. For example, the PEV 10 may be a fully electric vehicle such that the engine 22 may be optional, as shown in FIG. 1. By way of non-limiting example, the PEV 10 can operate in a charging depleting (CD) mode, a charge-sustaining (CS) mode, and a charging mode. In charge-depleting (CD) mode, the PEV 10 uses the electrical energy from the HV battery 16 to propel the vehicle 10. The vehicle 10 in the charge-depleting (CD) mode can operate in one of a fully electric mode (electric mode) where the vehicle 10 is powered only by energy stored in the HV battery 16, and an extended range mode (ERM) where the vehicle 10 is powered by electricity produced by the engine 22. In the charge-sustaining (CS) mode, the PEV 10 only uses energy primarily from the fuel powered engine 22 to propel the vehicle 10 and thus reserves (e.g., holds) the battery charge of the HV battery 16 at the then current state of charge (SOC). By way of example, the engine 22 may be an internal combustion engine. While operating the PEV 10 in a charging mode, the PEV 10 uses energy from the engine 22 transferred to the motor-generator 18 to charge the HV battery 16 in the RESS 14 using the motor-generator 18 in generating mode. During vehicle operation, the PEV 10 can shift between charging mode, charge-depleting (CD) mode and charge-sustaining (CS) mode.

The motor-generator 18 is electrically connected to the RESS 14 via a power inverter module (PIM) 34. The PIM 34 may generally be configured for converting DC power to AC power and vice versa as needed. The HV battery 16 can be selectively recharged via the motor-generator 18 when the motor-generator 18 is operating in its capacity as a generator. In the example shown, the motor-generator 18 is in mechanical communication with the transmission 20 via the transmission input shaft 26. The transmission 20 may include a plurality of rotating gears, clutches, and or other components (not shown) that may selectively couple, either alone or in combination, the transmission input shaft 26 with the transmission output shaft 32.

The HV battery 16 is connected to a vehicle interface control module (VICM) 36 via a battery disconnect unit (BDU) 38. The VICM 36 is electrically connected to a powertrain controller 40. The PEV 10 further includes an auxiliary power source 42, which is a relatively low voltage (LV) energy storage device such as a 12-volt battery, and which, in a non-limiting example, is referred to herein as a LV battery 42. The LV battery 42 is electrically connected to the VICM 36 and to the powertrain controller 40 and is suitable for powering each of the VICM 36 and the powertrain controller 40.

The motor-generator 18, the transmission 20, and the engine 22 may be in electronic communication with the powertrain controller 40. In one configuration, the powertrain controller 40 may include, for example, an engine control module 44 (ECM 44) for controlling the operation of the engine 22, a hybrid control module 46 (HCM 46) for controlling the operation of the motor-generator 18, and/or a transmission control module 48 (TCM 48) for controlling the operation of the transmission 20. The powertrain controller 40 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The ECM 44, HCM 46, and TCM 48 may be embodied as software or hardware and may or may not be physically separated from each other. In one configuration, the modules 44, 46, 48 may be compartmentalized functions executed by the same physical structures of the powertrain controller 40. In another configuration, each module 44, 46, 48 may be relegated to its own hardware computing device. Regardless, every module 44, 46, 48 may be in digital communication with the other modules 44, 46, 48 to coordinate the overall behavior of the vehicle powertrain 12. Each module 44, 46, 48 may be configured to automatically perform one or more control/processing routines that may be embodied as software or firmware associated with the module 44, 46, 48. It should be noted that this specific configuration of the "modules" is described as such for clarity. In practice, however, any specific function described as within one of the modules may be executed by another module, or alternatively, all of the functions may simply be executed by the controller 40 without separate identification of the modules.

In the example shown, the VICM 36 is in electrical communication with the powertrain controller 40, the PIM 34, a charger 52, a DC/DC converter 54, a heating module 56 and a cooling module 58, and one or more contactors 50 within the RESS 14, including one or more contactors 50 within the BDU 38. The VICM 36 may be configured for controlling the operation of the PIM 34, the charger 52, the DC/DC converter 54, the heating module 56, the cooling module 58, and the one or more contactors 50 within the RESS 14. Controlling the one or more contactors 50 includes controlling the actuating force exerted on each of the contactors 50 by a respective actuator 60, for example, by controlling the level of actuating power or current provided to each respective one of the contactors 50, to actuate each respective contactor 50 between an open state and a closed state. The VICM 36 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The VICM 36 may include software or hardware to control the operation of each of the PIM 34, the charger 52, the DC/DC converter 54, the heating module 56, the cooling module 58, and the one or more contactors 50 within the RESS 14, where the embodied software or hardware for controlling each of these elements may or may not be physically separated from each other. In one configuration, control of one or more of the PIM 34, the charger 52, the DC/DC converter 54, the heating module 56, the cooling module 58, and the one or more contactors 50 may be provided by compartmentalized functions executed by the same physical structures of the VICM 36. In another configuration, control of each respective one of the PIM 34, the charger 52, the DC/DC converter 54, the heating module 56, the cooling module 58, and the one or more contactors 50 may be relegated to its own respective hardware computing device, where the combination of these devices defines the VICM 36. Regardless, the VICM 36 is configured to coordinate the overall behavior of the RESS 14, such that the VICM 36 may be configured to automatically perform one or more control/processing routines that may be embodied as software or firmware associated with the VICM 36, including but not limited to the method 100 shown in FIG. 3. It should be noted that the specific configuration of the VICM 36, the powertrain controller 40, the ECM 44, HCM 46, and TCM 48, e.g., the "modules" is described as such for clarity. In practice, however, any specific function described as within one of the modules may be executed by another module, or alternatively, all of the functions may simply be executed by one or the other of the VICM 36 and the powertrain controller 40 without separate identification of the module or modules executing the specific function.

The PIM 34, the DC/DC converter 54, the heating module 56, the cooling module 58, the charger 52, and the one or more contactors 50 are in electrical communication with the VICM 36 within the RESS 14. The PIM 34 may generally be configured for converting DC power to AC power and vice versa as needed. The DC/DC converter 54 is adapted to convert a supply of DC power from a high-voltage level to a low-voltage level, and vice versa, as determined by the VICM 36. The heating and cooling modules 56, 58 are configured, respectively, to provide heating and cooling to the RESS 14, and may be characterized as high load devices, e.g., high voltage loads, selectively powered by the HV battery 14 during operation of the vehicle 10. The charger 52 is in electrical communication, e.g., is electrically connected to a charging port 70. The charging port 70 is configured to selectively receive a charging connector (not shown) connectable to an external source of electricity, for selective use in charging the HV battery 16 of the PEV 10. The external source of electricity may be provided via an electric vehicle (EV) charging station or other charging point, such as an electrical outlet connected to a power grid.

The charging point may include a charging connector (not shown) which is connectable to the charging port 70 of the RESS 14. The charging point is configured to output a control pilot via a connection established between the charging connector and the charging port 70, which is received by the VICM 36 via the charger 52, and is used by the VICM 36 to control charging of the HV battery 16 during a battery charging event. The control pilot, also referred to herein as a charging pilot signal, is configured to identify characteristics of the external source of electricity to the VICM 36. The VICM 36 may utilize the charging pilot signal to identify the external source of electricity connected to the RESS 14 via the charging port 70 by mode and/or type, and/or to identify the ampere capacity of the external power source which is available for charging the HV battery 16. For example, the charging pilot signal may identify the external power source as an SAE Level 1 (240 volt) external power source or as an SAE Level 2 higher voltage external power source (e.g., a 500 volt DC quick charging power source). By way of example, the charging pilot signal may change based on conditions defined by the external power source and the HV battery 16. For example, the charging pilot signal may change based on the charge current, which may be set by location, for example, as an 8 amp (8 A) or 10 amp (10 A) charge current from a 120 volt (120V) outlet. For example, the charging pilot signal may change to indicate the external power source has been connected to the charging port 70 and RESS 14, where the change may be interpreted as a wake up signal to the VICM 36, to wake up the VICM 36 to control charging of the HV battery 16 during a charging event. The VICM 36 may be programmed to selectively execute instructions to control charging of the HV battery 16. The instructions may include, for example, one or more instructions to actuate one or more of the contactors 50 to a closed position during charging of the HV battery 16, control the level of energy flow from the external power source to the HV battery 16 during charging of the HV battery 16, discontinue charging of the HV battery 16 upon charging of the HV battery 16 to a predetermined state of charge (SOC), and open the one or more contactors 50 after charging of the HV battery 16 is discontinued.

In the example shown, the RESS 14 includes a plurality of contactors 50, which are configured to connect and disconnect the HV battery 16 from other components of the RESS 14. Each of the contactors 50 is connected to the VICM 36 by a contactor control circuit 72, also referred to herein as a control circuit 72. In the non-limiting example shown in FIG. 1, the RESS 14 includes a main negative (HV−) contactor 50A which is electrically connected to the VICM 36 by the control circuit 72A, a pre-charge contactor 50B which is electrically connected to the VICM 36 by the control circuit 72B, a main positive (HV+) contactor 50C which is electrically connected to the VICM 36 by the control circuit 72C, and a charging positive contactor 50D which is electrically connected to the VICM 36 by the control circuit 72D. The main negative contactor 50A is also referred to herein as the (HV−) contactor, and the main positive contactor 50C is also referred to herein as the (HV+) contactor. The example shown in FIG. 1 is non-limiting, and it would be understood that more or less contactors 50 than those illustrated by FIG. 1 may be included in the RESS 14 and/or the vehicle 10. For clarity, reference is made in the description to a contactor 50, in the singular, or to a plurality of contactors 50 when describing functions, characteristics, operations, etc. which are common to each of the contactors 50A, 50B, 50C, 50D of the plurality of contactors 50. For example, each of the contactors 50 includes an actuator 60. In describing a function, characteristic, operation, etc. which is specific to a respective one of the contactors 50A, 50B, 50C, 50D, the respective specific one of the contactors 50A, 50B, 50C, or 50D is identified in the description. For example, the pre-charge contactor 50B is in series with a pre-charge resistor 66. The pre-charge contactor 50B may also be known or referred to as a direct current (DC) bus, or as a high voltage (HV) DC rail. Likewise, reference is made in the description to a control circuit 72, in the singular, or to the plurality of control circuits 72 when describing functions, characteristics, operations, etc. which are common to each of the control circuits 72A, 72B, 72C, 72D. For example, each of the control circuits 72 is electrically connected to the VICM 36. In describing a function, characteristic, operation, etc. which is specific to a respective one of the control circuits 72A, 72B, 72C, 72D, the respective specific one of the control circuits 72A, 72B, 72C, 72D is identified in the description. For example, the VICM 36 sends an actuating current to the pre-charge contactor 50B via the control circuit 72B.

As shown in FIG. 1, the RESS 14 includes a battery disconnect unit (BDU) 38, which includes the pre-charge contactor 50B in series with a pre-charge resistor 66, both of which are connected in parallel with the (HV+) contactor 50A, where the (HV+) contactor 50A and the pre-charge contactor 50B are positioned to disconnect the positive (+) lead of the HV battery 16 from the remainder of the RESS 14, such that current is prevented from flowing from the HV battery 16 when both of the (HV+) contactor 50A and the pre-charge contactor 50B are in an open state. In normal operation of the PEV 10, the HV battery 16 is brought on-line, e.g., connected, by the VICM 36 signaling the pre-charge contactor 50B to close, for example, by sending an actuating current to the pre-charge contactor 50B via the control circuit 72B initially while the (HV+) contactor 50A remains open, so that the HV battery 16 can be brought online in a controlled manner and without exposing the (HV+) contactor 50A and/or the VICM 36 to an inrush current from the HV battery 16. Upon closing the pre-charge contactor 50B, current from the HV battery 16 is conducted to the pre-charge contactor 50B via the pre-charge resistor 66, such that direct exposure of the (HV+) contactor 50A, the VICM 36 and the remaining electrical componentry of the RESS 14 to an inrush current upon initial electrical connection of the HV battery 16 is prevented. Once the pre-charge contactor 50B has reached a predetermined threshold voltage, then the VICM 36 actuates the (HV+) contactor 50A to close and the pre-charge contactor 50B to subsequently open, such that after initial start-up and during normal operation, current flows to the RESS 14 from the HV battery 16 via the main positive (HV+) contactor 50A, which is maintained in a closed state by the actuating current provided by the VICM 36. In the example shown in FIG. 1, when either the pre-charge contactor 50B or the (HV+) contactor 50A are actuated to open or close by the VICM 36 via control circuits 72B, 72A, respectively, the main negative (HV−) contactor 50C and the charging contactor 50D is actuated to open or close by the VICM 36 via the control circuit 72C as needed. In the example shown in FIG. 1, the (HV−) contactor 50C is positioned to disconnect the negative (−) lead of the HV battery 16 when the (HV−) contactor 50C is an open state, such that current is prevented from flowing from the HV battery 16 through the PIM 34 and the heating and cooling modules 56, 58. In the example shown in FIG. 1, the RESS 14 further includes a charging contactor 50D positioned to disconnect the negative (−) lead of the HV battery 16 when the charging contactor 50D is an open state, such that current is prevented from flowing from the HV battery 16 through the charger 52 and the DC/DC converter 54, and to disconnect the negative (−) lead of the HV battery 16 when the charging contactor 50D is in an open state, such that current is prevented from flowing from an external charging source connected via the charging port 70 to the HV battery 16.

Each of the contactors 50 includes an actuator 60 for actuating movement of a moveable contact 62 between an open and a closed position. In the open position, the movable contact 62 is positioned away from a fixed contact 64, such that electricity cannot be conducted through the contactor 50. The contactor 50 is in an "open state" when the movable contact 62 is in the open position and electricity is prevented from being conducted through the contactor 50. In the closed position the movable contact 62 is in contact with the fixed contact 64 such that electricity can be conducted through the contactor 50. The contactor 50 is in a "closed state" when the movable contact 62 is in the closed position such that electricity can be conducted through the contactor 50. The RESS 14 may include a plurality of contactors 50, where each of the contactors 50 is configured to electrically isolate the HV battery 16 from a portion of and/or specific elements of the RESS 14 and/or the vehicle 10.

In a non-limiting example, the actuator 60 includes an electromagnet which is actuable by an actuating force provided by the VICM 36, which may also be referred to herein as an actuating power. The actuating force provided by the VICM 36, by way of non-limiting example, may be expressed herein in terms of the level of actuating current as determined by the level of actuating force provided by the VICM 36. In one example, the actuator 60 is a solenoid which, when actuated by the actuating current, exerts a closing force on the movable contact 62 to move the movable contact 62 toward the fixed contact 64, for example, by extending a plunger (not shown) of the solenoid against the movable contact 62 when the solenoid is actuated. The actuator 60 may be referred to herein, by way of non-limiting example, as a solenoid. By way of non-limiting example, the fixed contact 64 may be configured as a pair of terminals (not shown), where movement of the movable contact 62 by the solenoid 60 causes the movable contact 62 to make concurrent contact with both terminals to close the high voltage circuit. The closing force exerted by the actuator 60 at any time t is proportional to the level of actuating power provided by the VICM 36 at that time t, e.g., as the level of actuating current provided to the actuator 60 by the VICM 36 is increased, the closing force exerted by the actuator 60 on the movable contact increases, and as the level of actuating current provided to the actuator 60 by the VICM 36 is decreased, the closing force exerted by the actuator 60 on the movable contact 62 decreases. The level of closing force required to close the contactor 50, e.g., to move the movable contact 62 in contact with the fixed contact 64 and to hold the movable contact 60 in contact with the fixed contact 64 to maintain the contactor 50 in a closed state can vary over time, such that the level of actuating power required to provide the closing force will vary over time. For example, the movable contact 62 can include a biasing element, which may be a mechanical biasing element such as a spring, which is configured to bias the movable contact 62 in the open position, such that the biasing element exerts an opening force in opposition to the closing force exerted by the actuator 60. The initial closing force to close the contactor 50 from an open state, e.g., to initiate movement or "pull-in" of the movable contact 62 toward the fixed contact 64, also referred to herein as the pull-in force, must be sufficiently high to overcome the opening force exerted by the biasing element. After the contactor 50 is closed, the closing force to hold the contactor in the closed state (the holding force) is less than the pull-in force, absent the influence of other factors such as vehicle conditions and/or vehicle parameters including electrical conditions within the RESS 14 such as HV battery current draw, each of which may exert an opening force on the contactor 50 affecting the level of holding force required to hold the contactor 50 in a closed position when the RESS 14 is energized, e.g., during vehicle operation and/or during a charging event.

Figure 2:
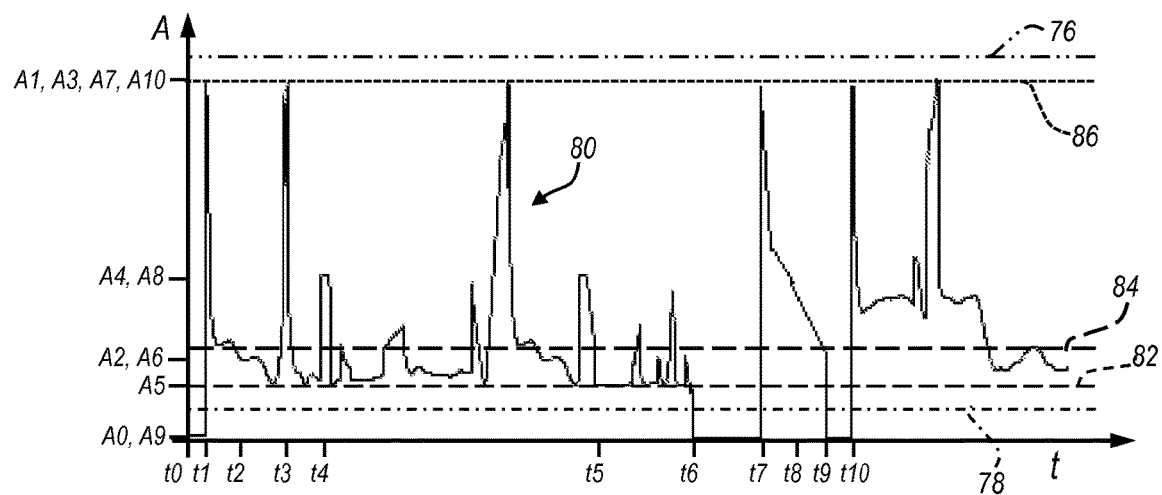
FIG. 2 is a schematic diagram of actuating power provided over time to the contactor included in the RESS of FIG. 1.

Each contactor 50 is characterized by a power rating and a drop-out power defined by the configuration of that respective contactor 50. The power rating may be expressed for each respective contactor 50, for example, as a current rating and a voltage rating of the respective contactor 50. By way of example, a larger sized contactor 50 will have a relatively higher power rating than a relatively smaller sized contactor 50. The "power rating" as that term is used herein, is the level of power which can be conducted through the contactor while remaining within the temperature rating of the contactor, where the temperature rating is the temperature limit at which the contactor may be operated to avoid temperature-related deterioration of the contactor. The "pull-in power," as that term is used herein, is the minimum level of power, e.g., pull-in current, which is required to actuate the contactor 50 from its open (de-energized) position to the closed position. The "holding power," as that term is used herein, is the minimum level of power, e.g., holding current, which is required to hold the energized contactor 50 in its closed position after initial pull-in of the contactor 50 from the open position to the closed position. The "drop-out power" as that term is used herein, is the maximum level of power, e.g., the drop-out current, below which the energized contactor 50 will return to its open position, e.g., the minimum level of power which must be applied to the energized contactor to prevent the energized contactor from returning to its open position, absent other factors which may exert an opening force on the contactor 50, such as shock and vibration exerted on the contactor 50 due to vehicle operating conditions, which may result in a bounce and/or increase in the opening force exerted at the contact interface between the movable contact 62 and fixed contact 64. FIG. 2, in a non-limiting example, shows the actuating power provided to a contactor 50 of the RESS 14 according to the method 100 illustrated by the flowchart shown in FIG. 3, where the vertical axis shows the amplitude (A) of power applied to the contactor 50 by the VICM 36, e.g., the actuating power 80, at time t shown on the horizontal axis. In the example shown, the power rating of the contactor 50 is indicated by line 76 and the drop-out power level is indicated by line 78. As shown in FIG. 2, the VICM 36, using the method 100 shown in FIG. 3, controls the actuating power 80 provided to, e.g., applied to the contactor 50, between a "maximum power limit" indicated by line 86 and a "minimum power limit" indicated by line 82. The "average actuating power" over the time period represented by the graph shown in FIG. 2 is indicated by line 84. The maximum power limit, minimum power limit, and average actuating power may be expressed herein in terms of the current, as current relates to power, e.g., expressed respectively as a maximum current limit, a minimum current limit, and an average actuating current.

The maximum power limit 86 is defined by the power rating 76 of the contactor 50 and the pull-in power of the contactor 50, such that the maximum power limit 86 is less than the power rating 76 by an upper margin and is greater than the pull-in power. The upper margin, e.g., the difference between the power rating 76 and the maximum power limit 86, may be defined by a predetermined ratio of the power rating 76 to the maximum power limit 86, referred to herein as the upper margin ratio. By way of non-limiting example, the upper margin ratio is greater than or equal to 1.2 and less than or equal to 1.5. The contactor 50 is sized such that the maximum power limit 86 at the predetermined upper margin ratio is greater than the pull-in power required to initially close the contactor 50 when the contactor 50 is energized from a non-energized state. The minimum power limit 82 is defined by the drop-out power level 78 of the contactor 50, such that the minimum power limit 82 is greater than the drop-out power level 78 by a lower margin. The lower margin, e.g., the difference between the drop-out power level 78 and the minimum power limit 82, may be defined by a predetermined ratio of the minimum power limit 82 to the drop-out power level 78, referred to herein as the lower margin ratio. By way of non-limiting example, the lower margin ratio is greater than or equal to 1.2 and less than or equal to 1.5.

Vehicle conditions and/or vehicle parameters which exert an opening force on the contactor 50 which may affect the level of closing force required to initially close and/or hold the movable contact 62 in contact with the fixed contact 64 in a closed state include, by way of non-limiting example, the level of current draw through the contactor 50 from the HV battery 16 when the RESS 14 is energized, and shock and vibration forces exerted on the contactor 50 by vehicle operating conditions which may cause bounce at the contact interface between the movable contact 62 and fixed contact 64. At higher levels of current draw, the Lorentz forces and/or the blow-off electromagnetic forces, which act as opening forces on the contactor 50, are higher than at relatively lower levels of current draw. The level of current draw through the contactor 50 can vary with variation in electrical load on the RESS 14 and components thereof, due to vehicle operating conditions, vehicle speed, operating temperature, etc. For example, when the vehicle 10 is operating in fully electric or extended range mode (ERM), e.g., in a charge-depleting (CD) mode, the electrical load on the RESS 14 and the level of current draw from the HV battery 16 through the contactor 50 increases as the power demand by the motor-generator 18 and/or the vehicle speed increases. For example, current draw increases substantially during electric wide open throttle (WOT) operating conditions. Current draw during a charging event can be variable and proportional to the state of charge of the HV battery 16 and/or the charging rate. For example, current draw through the contactor 50 is greater during rapid charging of the HV battery 16 and/or during charging of the HV battery 16 at a low state of charge (SOC), relative to a condition where current draw through the contactor 50 is relatively lower. For example, current draw through the contactor 50 may be relatively lower when the vehicle 10 is operating in charge sustaining (CS) mode and/or when the HV battery 16 is at a relatively higher SOC during a charging event, where the charger 52 may be providing power from an external source via the charging port 70 at a power level sufficient to maintain a predetermined SOC level of the HV battery 16, for example, at the end of a charging cycle. Shock and vibration forces transmitted to the contactor 50, which may act as opening forces on the contactor 50, are higher under certain operating conditions, such as during vehicle 10 travel over bumpy roads and/or at speeds where vibration levels conducted through the vehicle 10 to the contactor 50 may be increased, relative to other operating conditions, such as vehicle 10 travel over smooth roads and/or at speeds where vibration levels are decreased.

The vehicle 10 includes a plurality of sensors 68 which are in communication with the VICM 36, to communicate the respective parameters sensed by each of the respective sensors 68, which can be used by the VICM 36 to determine the opening forces attributed to conditions of the vehicle 10, such that the VICM 36 can use feed forward control methods to determine the actuating power 80 to be provided to the contactor 50 at the time the vehicle conditions and/or parameters are detected by the sensors 68 and/or VICM 36. FIG. 1 shows, in a non-limiting example, a plurality of sensors 68 in communication with the VICM 36 and/or the powertrain controller 40. One or more of the sensors 68 may be configured to sense parameters of the powertrain 12 including, but not limited to, the parameters of the engine 22, the transmission 20, the motor-generator 18, input and output shafts 26, 24, 32, axle 28, etc. and to communicate the sensed parameters to the powertrain controller 40, for communication to the VICM 36 via the powertrain controller 40. For example, one or more of the sensors 68 may be configured to sense vehicle speed, braking, vibration, shock, temperature, etc. One or more sensors of the sensors 68 may be configured to sense parameters of the RESS 14, including but not limited to current draw from the HV battery 16, current draw through the charger 52, current draw through the charging port 70, current draw through each of the respective contactors 50, a charging pilot signal received via the charging port 70 from an external charging source, where the charging pilot signal may include a wake-up signal to the VICM 36, temperature of one or more of the HV battery 16, charger 52, contactors 50, etc, electrical load of one or more of the heating and cooling modules 56, 58, and/or other electrical, temperature or other operating parameters of the various components of the RESS 14 shown in FIG. 1. It would be understood that the number, arrangement and configuration of sensors 68 shown in FIG. 1 and/or described herein is not limiting, and the vehicle 10 may include more or less sensors 68 of various configurations as required to execute the method 100 shown in FIG. 3 and described herein.

Figure 3:
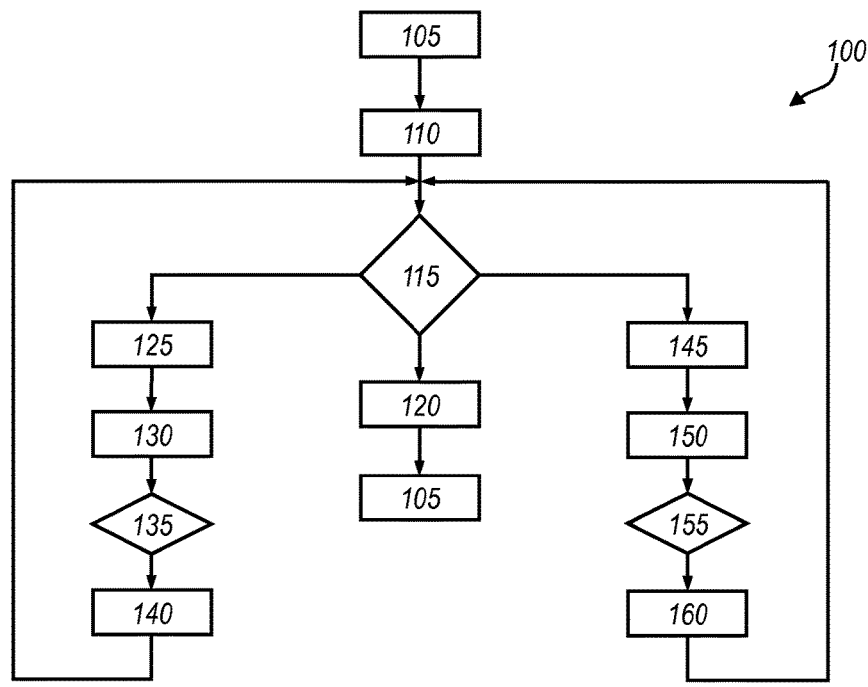
FIG. 3 is a flow chart describing an example method for controlling the actuating power provided to the actuator of FIG. 1.

The VICM 36 is configured to provide actuating power 80 to each of the contactors 50, where the VICM 36 may vary the actuating power, which in an illustrative example is referred to as the actuating current 80, over time using feed forward control based on parameters detected by the sensors 68, and algorithms, look-up tables, processes, etc. stored in the memory of the VICM 36 and executable by the VICM 36, according to a non-limiting method 100 shown in FIG. 3. The VICM 36 varies the actuating current 80 over time, such that the actuating current 80 may be characterized as dynamic, e.g., changed over time by the VICM 36 in response to changes in operating conditions and parameters of the vehicle 10, HV battery 16 and/or RESS 14. By way of example, the VICM 36 may use pulse width modulation (PWM) to vary the actuating power provided by the VICM 36 to each of the contactors 50 by varying the PWM duty cycle of the actuating power 80 to each respective contactor 50 at a PWM frequency determined by the VICM 36. By way of example, the PWM frequency may be defined by a feed forward window in the range of 12 to 25 milliseconds. In another example, the PWM frequency may be defined by a feed forward window which is less than 12 milliseconds. The VICM 36 may include one or more algorithms, look-up tables, processes, etc., to modulate the actuating power to each of the contactors 50 in the RESS 14, in response to changes in vehicle condition and/or vehicle parameters, for example, according to the method 100 shown in FIG. 3 at a PWM frequency using feed forward parameters determined by the VICM 36 and/or provided to the VICM 36. For example, the feed forward parameters determined by and/or received by the VICM 36 can include current draw through the various elements of the RESS 14, including HV battery current draw of the HV battery 16, charging parameters during charging of the HV battery 16, via the charging port 70 and charger 52 from an external power source and/or charging via the motor-generator 18 and PIM 34, state of charge (SOC) of the HV battery 16, the temperature of one or more of the HV battery 16, the charger 52, one or more of the contactors 50, the BDU 38, etc. Feed forward parameters determined by and/or received by the VICM 36 can include vehicle speed, vehicle braking information, shock parameters, vibration parameters, harshness parameters, and/or other powertrain operating parameters including operating parameters of the motor-generator 18 during operation of the vehicle 10 in charge-depleting (CD) and/or charge-sustaining (CS) modes. In a non-limiting illustrative example, a PWM duty cycle for actuating power 80 provided by the VICM 36 to one of the contactors 50 over a period of time is shown in FIG. 2, where at time t0, the vehicle condition is such that the vehicle 10 is not energized, e.g., the vehicle 10 is not powered (is in a key-off state) and the HV battery 16 is not being charged, such that at time t0 the level of actuating power 80 to the contactors 50 is zero, e.g., each of the contactors 50 is not actuated and is in an open position.

As described in further detail herein and illustrated by FIGS. 2 and 3, the VICM 36 in real time determines the plurality of parameters of the PEV 10 (PEV parameters) using input from the plurality of sensors 86 and/or controllers in the vehicle 10 including the VICM 35, the powertrain controller 40, etc., and executes a feed-forward control method shown schematically in FIG. 3, to modulate using, for example, PWM, the actuating power 80 provided to each of the contactors 50 based on the PEV parameters, such that the actuating power 80 is dynamic over time and modulated according to a predetermined PWM frequency and as determined by one or more algorithms and/or processes illustrated by the method 100 shown in FIG. 3. The actuating power 80 may be expressed herein in terms of actuating current 80 provided to the contactor 50 from the VICM 36.

Referring to FIGS. 2 and 3, the method 100 shown in FIG. 3 is initiated at step 105, with the vehicle 10 in a non-energized condition, e.g., a powered-off condition. In the non-energized or unpowered condition the vehicle 10 is in a key-off state and is neither operating nor receiving power from an external power source connected to the vehicle 10, e.g., in the unpowered condition the HV battery 16 is not being charged by an external power source and/or is not connected to an external power source via the charging port 70. In the non-energized condition, each of the contactors 50 is in an open position such that the HV battery 16 is electrically isolated from the remainder of the RESS 14. At step 105 the vehicle 10, via the VICM 36 directly or via another controller of the vehicle 10 such as the powertrain controller 40 in communication with the VICM 36, detects a request to energize the vehicle 10 from the non-energized condition, e.g., to power-on the vehicle 10 from the powered-off condition, to operate the vehicle 10 or to charge the vehicle 10 using an external power source. For example, at step 105 the VICM 36 may detect an energizing request in the form of an ignition event such as a key-on event energizing, e.g., powering-on, of one or more electrical components and/or powertrain components of the vehicle 10, to power the vehicle 10 in a vehicle operating condition. Alternatively, at step 105 the VICM 36 may detect an energizing request in the form of a wake-up signal generated by an external power source connected to the RESS 14 and VICM 36 via the charging port 70, where the wake-up signal, which may be defined by a charging control signal, signals the VICM 36 to wake-up from a non-energized state and initiate a charging event where the vehicle 10 is in an external charging condition. The example of a wake-up signal is non-limiting, and the vehicle 10 may detect an energizing request, for example, by sensing connection of the vehicle 10 to an external energy source, for example, by a sensor 68 of the vehicle configured for that purpose, by a timer provided for that purpose, or by a wireless local area network (wLAN) signal received by the vehicle 10.

The method 100 proceeds from step 105 to step 110, where the VICM 36 actuates initial closing of the contactors 50 in a pre-charge sequence to bring the HV battery 16 on-line in a controlled manner and without exposing the (HV+) contactor 50A and/or the VICM 36 to an inrush current from the HV battery 16. In the non-limiting example shown in FIG. 1, each of the contactors 50A, 50B, 50C, 50D is characterized by a respective power (current) rating, pull-in current, and drop-out current defined by the configuration of and/or specified for the respective contactor 50A, 50B, 50C, 50D. The respective power (current) rating, pull-in current, and drop-out current of each respective contactor 50A, 50B, 50C, 50D, in one example, is stored in and retrievable from the memory of the VICM 36. A respective predetermined maximum current limit and predetermined minimum current limit for each respective one of the contactors 50A, 50B, 50C, 50D is stored in the memory of the VICM 36 and retrievable from memory by the VICM 36 for use in controlling actuating of the contactors 50. In one example, the respective power (current) rating, pull-in current, drop-out current, maximum current limit, and predetermined minimum current limit for each respective one of the contactors 50 may be stored in one or more look-up tables accessible by the VICM 36. The look-up table(s) may be stored on the VICM 36 and/or on a controller of the vehicle 10 in communication with the VICM 36.

At step 110, the VICM 36 sends a pre-charge actuating current to the pre-charge contactor 50B to close the pre-charge contactor 50B while the (HV+) contactor 50A remains open, where the pre-charge actuating current provided to the pre-charge contactor 50B is greater than or equal to the pull-in current of the pre-charge contactor 50B and less than the power rating of the pre-charge contactor 50B. By closing the pre-charge contactor 50B, current from the HV battery 16 is conducted to the pre-charge contactor 50B via the pre-charge resistor 66, such that direct exposure of the (HV+) contactor 50A, the VICM 36 and the remaining electrical componentry of the RESS 14 to an inrush current upon initial electrical connection of the HV battery 16 is prevented. Step 110 continues with the VICM 36, after determining the pre-charge contactor 50B has reached a predetermined threshold voltage, actuating the (HV+) contactor 50A to a closed position by providing an initial actuating current to the (HV+) contactor 50A which is equal to or greater than the pull-in current and less than the power rating of the (HV+) contactor 50A. In one example, the initial actuating current is the maximum actuating current determined for the (HV+) contactor 50A by the VICM 36. After closing the (HV+) contactor 50A, the pre-charge contactor 50B is opened by reducing the pre-charge actuating current to a current level less than the drop-off current level of the pre-charge contactor 50B, and/or terminating the pre-charge actuating current. After or concurrently with closing the (HV+) contactor 50A, the VICM 36 provides an initial actuating current to the remaining contactors 50 in the RESS 14, which, in the example shown in FIG. 1, include the (HV−) contactor 50C and the charging contactor 50D. In one example, the initial actuating current provided, respectively, to each of the contactors 50C, 50D is the respective maximum current level predetermined for the respective contactor 50C, 50D. Providing the initial actuating current at the maximum current level for the respective contactor 50C, 50D establishes an initial contact which may provide a relatively better, e.g., more stable, contact for the remainder of the drive cycle.

The method 100 proceeds from step 110 via steps 115 through 160, in a looping fashion, where the method 100 in one example is looped through steps 115 through 160 in a feed forward manner and at a predetermined time interval, which may be defined by the PWM frequency used by the VICM 36 to module the respective actuating power 80 provided to each respective contactor 50, and/or by the feed forward window. Each of the steps 115 through 160 is applied to each of the contactors 50 in the RESS 14, to determine a respective dynamic actuating power 80, as shown in FIG. 2, for each respective one of the contactors 50. The steps 115 through 160 may be executed concurrently by the VICM 36 for each of the plurality of contactors 50 using vehicle parameter data determined by the VICM 36 at each looping cycle of the steps 115 through 160. It would be understood that each of the contactors 50 may be distinguished from at least one other of the contactors 50 by one or more of being differently configured, demonstrating a different level of an operating parameter such as actual operating temperature or current draw measured or determined at a sampling frequency in use in the vehicle 10, and/or by having one or more of a power (current) rating, a pull-in current level, a drop-out current level, a maximum current limit, and a minimum current limit which is different from at least one other of the contactors 50, and such that the dynamic actuating current level 80 determined for each of the plurality of contactors 50 by the VICM 36, during each looping cycle of the method 100, may be different for each of the contactors 50. For clarity of illustration, steps 115 through 160 are described herein as being applied to an exemplary contactor 50. In a non-limiting example, steps 115 through 160 will be described referring to the (HV+) contactor 50A and graph in FIG. 2 illustrating the dynamic actuating power 80 provided to the (HV+) contactor 50A over a time period t illustrated by FIG. 2.

Referring to FIGS. 2 and 3, at step 115 the vehicle condition of the vehicle 10 is determined as one of a vehicle operating condition, an external charging condition, and a non-energized condition. When the vehicle 10 is determined to be in a non-energized condition, for example, the vehicle is keyed-off from an operating condition and in a non-charging condition such that there is no current flow relative to the HV battery 16, the method proceeds to step 120. At step 120, the VICM 36 terminates actuating current to each of the contactors 50, such that the actuating current to each of the contactors 50 falls below the drop-out level of each respective contactor 50 to open the contactor 50 and electrically isolate the HV battery 16 from the electrical system of the RESS 14 and the vehicle 10. The method returns to step 105 from step 120, where at step 105 the vehicle 10 in the non-energized condition monitors for detection of an energizing request.

When the vehicle 10 is determined, at step 115, to be in a vehicle operating condition, e.g., in a key-on condition such that at least a portion of the vehicle electrical system is energized, the method proceeds to step 125. At step 125 the VICM 36 polls to determine one or more vehicle operating parameters, where polling to determine the one or more vehicle operating parameters can include receiving input from one or more of the sensors 68, from other controllers in the vehicle 10 such as the powertrain control 40, etc. The vehicle operating parameters may be polled at a predetermined time interval, where the predetermined time interval may be defined by one or more of the feed forward window, the PWM frequency used to modulate the dynamic actuating current 80, a predetermined sampling frequency established for the respective parameter, etc. The vehicle operating parameters polled by the VICM 36 at step 125 include parameters which can affect the holding and opening forces exerted on the contactor 50, which, as described previously, may include parameters such as the level of current draw through the contactor 50, where the level of current draw affects the magnitude of blow-off electromagnet force and Lorentz forces at the contact interface between the movable contact 62 and the fixed contact 64, the vehicle speed of the vehicle 10, the mode of operation of the vehicle 10 which may be, for example, a charge-depleting (CD) mode, a charge sustaining mode (CS), a fully electric mode, an extended range mode (ERM), etc., shock forces acting on the contactor 50 which may be resultant from, by way of non-limiting example, the interaction of the vehicle 10 with a bumpy, irregular, or non-continuous road surface, vibration forces acting on the contactor 50 which may be resultant from, by way of non-limiting example, the interaction of the vehicle 10 with a bumpy, irregular, or non-continuous road surface, from vehicle harmonics or vehicle component interactions activating a vibration in the vehicle, vehicle suspension, vehicle powertrain, etc. which is conducted through the structure of the vehicle 10 to act on the contactor 50, operating temperatures of the vehicle 10, include ambient operating temperature and localized operating temperature levels of one or more components of the RESS 14 including but not limited to the HV battery 16, the contactors 50 and the charger 52, etc.

At step 130, the parameter data collected by the VICM 36 at step 125 is analyzed, for example, by comparing the parameter data to predetermined limits, assessing magnitude and/or change in the level of the parameter data, for example, in comparison to previous samples taken of the parameter data, and/or to determine feed forward factors for use in determining whether a change in the actuating current provided to the contactor 50 is required or desirable. The VICM 36 may execute one or more algorithms stored in the memory of the VICM 36 and/or compare the parameter data collected at step 125 to one or more look-up tables to determine the feed forward factors. A change in the dynamic actuating current 80 may be desirable when the VICM 36 determines, for example, using feed forward control, that the level of holding force required to hold the contactor 50 in a closed condition has decreased such that the dynamic actuating current 80 can be reduced, thereby decreasing energy consumption in the vehicle 10 and/or providing a relative increase in the electric mileage (MPGe) of the vehicle 10. Decreasing the dynamic actuating current 80 provides additional advantages of reducing the average actuating current 84 and decreasing, on a relative basis, the operating temperature of the contactor 50, thereby increasing, on a relative basis, the useful life of the contactor 50. A change in the dynamic actuating current 80 may be desirable when the VICM 36 determines, for example, using feed forward control, that the level of holding force required to hold the contactor 50 in a closed condition is increasing such that the dynamic actuating current 80 should be increased to increase the holding current and counteract the increase in the blow-off electromagnetic force and/or Lorentz forces indicated by the feed forward factors, to prevent opening of the contactor 50 and/or disruption of current flow in the RESS 14 and/or with the HV battery 16.

At step 135, the VICM 36 determines whether a change in the dynamic current level 80 is indicated based on the feed forward factors determined at step 130, which may include, for example, determining the pulse width modulation (PWM) and the PWM frequency to be used in modulating the dynamic current level 80. If at step 135 it is determined that no change is indicated or required, the VICM 36 maintains the present level of the dynamic actuating current 80, and the method loops back to step 115. If at step 135 a change in the dynamic current level 80 is indicated, at step 140 the VICM 36 executes the change in dynamic current level 80, for example, by adjusting the PWM width or duty and/or PWM frequency as determined at step 135 to modulate the dynamic current level 80 to the indicated level, where the indicated level of the dynamic actuating current 80 is sufficient to maintain the contactor 50 in a closed state, for example, for the duration of the feed forward window corresponding to the feed forward factors. Upon completing step 140, the method loops back to step 115, to determine if a change in vehicle condition has occurred.

When the vehicle 10 is determined, at step 115, to be in an external charging condition, e.g., connected to an external power source, for example, via the charging port 70 such that at least a portion of the RESS 14 is energized, the method proceeds to step 145. At step 145 the VICM 36 polls to determine one or more external charging parameters, where polling to determine the one or more external charging parameters can include receiving input from one or more of the sensors 68, from other controllers in the vehicle 10 such as the powertrain control 40, etc. The external charging parameters may be polled at a predetermined time interval, where the predetermined time interval may be defined by one or more of the feed forward window, the PWM frequency used to modulate the dynamic actuating current 80, a predetermined sampling frequency established for the respective parameter, etc. The external charging parameters polled by the VICM 36 at step 145 include parameters which can affect the holding and opening forces exerted on the contactor 50, which as described previously may include parameters such as the level of current draw through the contactor 50, where the level of current draw affects the magnitude of blow-off electromagnet force and Lorentz forces at the contact interface between the movable contact 62 and the fixed contact 64, the state of charge (SOC) of the HV battery 16 which may affect the level of current draw from the external power source to the HV battery 16 during a charging event, the characteristics of the external power source such as voltage level, whether the vehicle 10 is connected to a Level 1 or Level 2 charging station, as those terms are commonly understood, the operating temperatures of the HV battery 16, the charging port 70, the charger 52, etc., ambient temperature of the vehicle 10, localized operating temperature levels of one or more components of the RESS 14 including but not limited to the HV battery 16, the contactors 50, the charging port 70, the DC/DC converter 54, the charger 52, etc.

At step 150, the parameter data collected by the VICM 36 at step 145 is analyzed, for example, by comparing the parameter data to predetermined limits, assessing magnitude and/or change in the level of the parameter data, for example, in comparison to previous samples taken of the parameter data, and/or to determine feed forward factors for use in determining whether a change in the actuating current provided to the contactor 50 is required or desirable, for example, to maintain the contactor 50 in a closed state for the duration of a predetermined feed forward window and/or to reduce the energy consumption in the vehicle 10. The VICM 36 may execute one or more algorithms stored in the memory of the VICM 36 and/or compare the parameter data collected at step 145 to one or more look-up tables to determine the feed forward factors. A change in the dynamic actuating current 80 may be desirable when the VICM 36 determines, for example, using feed forward control, that the level of holding force required to hold the contactor 50 in a closed condition has decreased such that the dynamic actuating current 80 can be reduced, thereby decreasing energy consumption in the vehicle 10 and/or providing a relative increase in the electric mileage (MPGe) of the vehicle 10. Decreasing the dynamic actuating current 80 provides additional advantages of reducing the average actuating current 84 and decreasing, on a relative basis, the operating temperature of the contactor 50, thereby increasing, on a relative basis, the useful life of the contactor 50. Decreasing the dynamic actuating current 80 may be indicated, for example, when the SOC of the HV battery 16 is relatively high, e.g., is approaching a SOC target or limit such that the current level of the external power source used to charge the HV battery 16 has been decreased to a relatively lower level to sustain the SOC at or near the SOC target without overcharging the HV battery 16 and/or overheating of the HV battery 16 during a charging event. A change in the dynamic actuating current 80 may be desirable when the VICM 36 determines, for example, using feed forward control, that the level of holding force required to hold the contactor 50 in a closed condition is increasing such that the dynamic actuating current 80 should be increased to increase the holding current and counteract the increase in the blow-off electromagnetic force and/or Lorentz forces indicated by the feed forward factors, to prevent opening of the contactor 50 and/or disruption of current flow in the RESS 14 and/or with the HV battery 16. An increase in the dynamic actuating current 80 may be indicated early in the charging event, for example, when the SOC of the HV battery 16 is relatively low such that the current level of the power supplied by the external power source is relatively high to expedite charging of the HV battery 16 to a higher SOC.

At step 155, the VICM 36 determines whether a change in the dynamic current level 80 is indicated based on the feed forward factors determined at step 150, which may include, for example, determining the pulse width modulation (PWM) and the PWM frequency to be used in modulating the dynamic current level 80. If at step 155 it is determined that no change is indicated or required in the level of the dynamic actuating current 80, then the VICM 36 maintains the present level of the dynamic actuating current 80 and the method loops back to step 115. If at step 155 a change in the dynamic current level 80 is indicated, at step 160 the VICM 36 executes the change in dynamic current level 80, for example, by adjusting the PWM and PWM frequency as determined at step 155 to modulate the dynamic current level 80 to the indicated level, where the indicated level of the dynamic actuating current 80 is sufficient to maintain the contactor in a closed state, for example, for the duration of a feed forward window corresponding to the feed forward factors. Upon completing step 160, the method loops back to step 115, to determine if a change in vehicle condition has occurred.

Referring to FIG. 2, an example dynamic power level 80 for a contactor 50 of the RESS 14 is shown for a time period represented by FIG. 2 and beginning at time t0, illustrating modulation of the dynamic power level 80 over the time period using the method 100 shown in FIG. 3, where the dynamic power level 80 is modulated based on feed forward factors determined at steps 130 and 150 of the method 100. In a non-limiting example, the dynamic power level 80 may be the dynamic power level 80 provided to the main positive (HV+) contactor 50A in the BDU 38 of the RESS 14. Examples of modulation of the dynamic power level 80 at various times t0 . . . t10 will be described related to the method 100 applied to control of the (HV+) contactor 50A (contactor 50A in this example), where the examples provided herein are non-limiting and for illustrative purposes. For example, at time t0 the vehicle 10 is in a non-energized state corresponding to the state of the vehicle 10 at step 105, such that the VICM 36 has terminated, e.g., ceased providing, an actuating current 80 to the contactor 50A, such that the actuating current A0 is zero and below the drop-out current 78, and the contactor 50A is opened to the open state to electrically isolate the HV battery 16 from the remainder of the RESS 14 via the current path including the contactor 50A.

At time t1, which in the example corresponds to a key-on event which initially energizes the vehicle 10, the VICM 36 at step 105 detects the key-on event and at time t1, after providing a pre-charge actuating current to the pre-charge contactor 50B to close the pre-charge contactor 50B at step 110, actuates the contactor 50A to a closed position by applying an actuating current A1 to the contactor 50A at t1 which, as shown in FIG. 2, is substantially equal to the maximum current limit 86 defined for the contactor 50A, and is greater than the pull-in current predetermined for the contactor 50A, such that a time t1 the contactor 50A is closed to connect the positive terminal (+) of the HV battery 16 to the remainder of the RESS 14 via the closed contactor 50A. In the example shown, the vehicle 10 is continuously in an operating condition from key-on at time t0 through time t6, such that from time t0 through time t6, the method 100 continues in looping fashion through steps 125, 130, 135 and 140, where for example, from time t1 to time t2 the VICM 36 at step 130 has identified feed forward factors indicating the holding current required to hold the contactor 50A in a closed position in the corresponding feed forward window is substantially less than the initial pull-in current and/or maximum current level 86. The dynamic actuating current 80 may be decreasing, for example, due to the vehicle 10 being operated at a moderate speed and/or under moderate current drawn conditions, such that the VICM 36 modulates the actuating current 80 to a level less than the maximum current limit 86. For example, at time t2, VICM 36 has modulated the dynamic actuating current 80 to an actuating current level A2 as shown on FIG. 2, thereby providing power savings to the vehicle 10 and operating the contactor 50A at a lower temperature.

At time t3, in the example shown, the VICM 36 detects forward feed factors indicating an increase in the actuating current level 80 is required to maintain the contactor 50A in a closed position, and the VICM 36 modulates the actuating current to an actuating current level A3, which in the example shown is substantially equal to the maximum current limit 86. For example, the VICM 36 at time t3 may have detected vehicle operating parameters indicating one or more of a substantial increase in speed, current draw, or bounce input (shock and vibration), requiring an increase in actuating current level 80 to ensure sustained closure of the contactor 50A. As shown in FIG. 2, the VICM 36 continues to modulate the actuating current level 80 in response to vehicle operating parameters detected at step 125 and feed forward factors determined at step 130 as the method 100 is executed in looping fashion from time t4 through time t5.

In the example of FIG. 2, the VICM 36 detects vehicle operating parameters and/or determines feed forward factors that indicate the holding force required to maintain the contactor 50A in a closed condition is minimal. For example, the VICM 36 at time t6 may have detected vehicle operating parameters indicating travel of the vehicle at a relatively low speed over a smooth road with relatively low current draw conditions, such that an actuating current less than the minimum current level 82 is sufficient to hold the contactor 50A in the closed position. The VICM 36 reduces the actuating current 80 at time t5 to the minimum current level 82 (current level A5) and maintains the actuating current 80 at the minimum current level 82, to provide a margin between the actuating current 80 and the drop-out current level 78 to ensure closure of the contactor 50A is maintained. At time t6 the vehicle is powered off, for example, by a key-off event, and the VICM 36 ceases providing an actuating current 80 to the contactor 50A, e.g., the actuating current 80 at time t6 decreases to zero, below the drop-out current level 78, and the contactor 50A is actuated to a closed position to electrically isolate the HV battery 16 from the remainder of the RESS14.

From time t6 to time t7, the method 100 is executed at step 105, where the VICM 36 monitors for detection of an energizing event and the contactor 50A remains open, e.g., the VICM 36 does not provide any actuating current 80 to the contactor 50A during the time frame t6 to t7. At time t7, the VICM 36 detects an energizing event which in the example shown in FIG. 2 is the connection of the vehicle 12 to an external power source via the charging port 70, for charging of the HV battery 16 using the external power source. At time t7, upon detection of the energizing event, steps 110 and 115 of the method 100 are executed, as previously described, with the VICM 36 providing a pre-charge actuating current to the pre-charge contactor 50B to close the pre-charge contactor 50B at step 110 and actuating the contactor 50A to a closed position by applying an actuating current A7 to the contactor 50A at t1 which, as shown in FIG. 2, is substantially equal to the maximum current limit 86 defined for the contactor 50A. The method 100 continues to step 115 where the VICM 36 determines the vehicle 10 is in an external charging condition, and begins executing steps 145, 150, 155 and 160 in a looping fashion for the time frame t7 though t9 that the vehicle 10 is in the external charging condition. After providing the initial closing actuating current A7 at time t7, to close the contactor 50A at the initiation of external charging, the VICM 36 detects charging parameters and/or feed forward factors defined by the charging parameters indicating the actuating current 80 required to maintain the contactor 50A in a closed position during external charging is decreasing from time t7 through the completion of the charging event at time t9, where the decrease in the actuating current 80 corresponds to the decrease in current draw by the HV battery 16 as the charging event progresses and the SOC of the HV battery 16 increases. As shown in FIG. 2, at the midpoint time t8 of the charging cycle occurring from time t7 through time t9, the VICM 36 has modulated the actuating current 80 to a current level A8. At the completion of the charging cycle at time t9, when current flow from the external power source to the HV battery 16 via the charging port 70 and charger 54 is terminated, the VICM 36 ceases to provide an actuating current 80 to the contactor 50A, e.g., the actuating current 80 at time t9 is at current level A9 equal to zero, to open the contactor 50A and electrically isolate the HV battery 16.

The method 100 at time t9 loops to step 115, where the VICM 36 determines the vehicle 10 is no longer in an energized state and is now in a non-powered state upon completion of the external charging event, and the method 100 loops to step 105, where the VICM 36 from time t9 to time t10 monitors to detect an energizing event. In the example shown in FIG. 2, at time t10 the vehicle is energized by a key-on event, and the actuating current 80 is adjusted by the VICM 36 to the maximum current limit to provide an actuating current level A10 at time t10 to close the contactor 50A and electrically connect the HV battery 16 to the RESS 14, and the method 100 is executed in a looping fashion as previously described to control modulation of the actuating current 80 during the remaining time period illustrated by FIG. 2. The average actuating current 84 provided by the VICM 36 to the contactor 50A during the time period illustrated by FIG. 2 is substantially less than the maximum current level 86, such that control and modulation of the actuating current 80 using the method 100 described herein is advantaged by providing a substantial energy savings, e.g., the difference between the average and maximum actuating currents 84, 86, to the vehicle 10, and by operating the contactor 50A at relatively lower operating temperatures such that the useful life of the contactor 50A is extended relative to operating at a higher temperature when actuated at the maximum current level 86.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method comprising:
   determining a condition of a vehicle to be one of an energized condition and a non-energized condition;
   wherein the vehicle comprises a controller in communication with a rechargeable energy storage system (RESS);
   wherein the RESS includes a rechargeable energy source electrically connected to at least one contactor;
   wherein the at least one contactor is in electrical communication with the controller and is selectively actuable between an open state and a closed state by a dynamic actuating current provided by the controller;
   wherein:
      the controller is configured to adjust the dynamic actuating current between a minimum power limit and a maximum power limit when the vehicle is in an energized condition;
      the maximum power limit is less than a power rating of the at least one contactor; and
      the minimum power limit is greater than a drop-out power level of the at least one contactor;
   wherein in the open state electrical power is prevented from flowing through the at least one contactor, and in the closed state electrical power is flowable through the at least one contactor;
   the method further comprising:
      when the vehicle condition is determined to be the non-energized condition:
         terminating the dynamic actuating current to the at least one contactor to open the at least one contactor to the open state; and
      when the vehicle condition is determined to be the energized condition:
         providing a present level of the dynamic actuating current to the at least one contactor;
         wherein the present level of the dynamic actuating current is sufficient to actuate the at least one contactor to the closed state at the present time;
      polling, via the controller, a parameter value of at least one parameter;
      wherein a change in the parameter value of the at least one parameter affects holding and opening forces exerted on the at least one contactor;
      determining a feed forward factor for a predetermined feed forward window, wherein the feed forward factor is defined by the at least one parameter;
      determining whether an adjustment to the present level of the dynamic actuating current is indicated by the feed forward factor; and
      adjusting the dynamic actuating current from the present level to an indicated level when an adjustment to the dynamic actuating current is indicated;
      wherein the indicated level of the dynamic actuating current is sufficient to maintain the at least one contactor in the closed state during the feed forward window.

2. The method of claim 1, further comprising:
   detecting, via the controller, a request to energize the rechargeable electrical storage system (RESS) from the non-energized condition;
   wherein the at least one contactor includes a pre-charge contactor and a main positive contactor electrically connected in parallel to the rechargeable energy source;
   actuating, via the controller, the pre-charge contactor to a closed state;
   actuating, via the controller, the main positive contactor to a closed state;
   wherein the main positive contactor is actuated to a closed state after determining, via the controller, that the pre-charge contactor in the closed state has reached a predetermined threshold voltage.

3. The method of claim 2, wherein the controller actuates the main positive contactor to the closed state by providing the dynamic actuating current at a maximum actuating current limit predetermined for the main positive contactor.

4. The method of claim 2, wherein:
   the vehicle in the non-energized condition is in a keyed-off condition; and
   the request to energize the RESS is one of a request generated by one of an external power source electrically connected to the RESS, a wake-up signal to initiate charging of the rechargeable energy source, a request to power-on the vehicle; and a vehicle key-on event.

5. The method of claim 1, wherein the at least one parameter is a current draw through the at least one contactor.

6. The method of claim 1, wherein:
   the energized condition is a vehicle operating condition; and
   the at least one parameter includes a vehicle operating parameter.

7. The method of claim 6, wherein the vehicle operating parameter is a vehicle speed of the vehicle.

8. The method of claim 6, wherein the vehicle operating parameter is a mode of operation of the vehicle.

9. The method of claim 8, where the mode of operation of the vehicle is one of a charge-depleting (CD) mode and a charge-sustaining (CS) mode.

10. The method of claim 6, wherein the vehicle operating parameter is defined by at least one of a shock force operating on the at least one contactor and a vibration operating on the at least one contactor.

11. The method of claim 1, wherein:
    the energized condition is an external charging condition; and
    the at least one parameter includes an external charging parameter.

12. The method of claim 11, wherein the external charging parameter is a state of charge (SOC) of the rechargeable energy source.

13. The method of claim 11, wherein:
    an external power source is electrically connected to the rechargeable energy source; and
    the external charging parameter is defined by current draw from the external power source to the rechargeable energy source.

14. The method of claim 1, wherein adjusting the dynamic actuating current includes modulating the dynamic actuating current at a pulse width modulation (PWM) frequency.

15. The method of claim 14, wherein the PWM frequency is defined by the feed forward window.

16. The method of claim 15, wherein the feed forward window has a predetermined duration in a range of 12 to 25 milliseconds.

17. The method of claim 15, wherein the feed forward window has a predetermined duration of less than 12 milliseconds.

18. A vehicle comprising:
- a controller in communication with a rechargeable energy storage system (RESS);
- wherein the RESS includes a rechargeable energy source electrically connected to at least one contactor;
- wherein the at least one contactor is in electrical communication with the controller and is selectively actuable between an open state and a closed state by a dynamic actuating current provided by the controller;
- wherein in the open state electrical power is prevented from flowing through the at least one contactor, and in the closed state electrical power is flowable through the at least one contactor;
- the controller configured to:
- determine a condition of the vehicle as one of an energized condition and a non-energized condition;
- when the vehicle condition is determined to be the non-energized condition:
  terminating the dynamic actuating current to the at least one contactor to open the at least one contactor to the open state; and
- when the vehicle condition is determined to be in the energized condition:
  provide a present level of the dynamic actuating current to the at least one contactor;
  wherein the present level of the dynamic actuating current is sufficient to actuate the at least one contactor to the closed state at the present time;
  poll, via the controller, a parameter value of at least one parameter;
  wherein a change in the parameter value of the at least one parameter affects holding and opening forces exerted on the at least one contactor;
  determine a feed forward factor for a predetermined feed forward window, wherein the feed forward factor is defined by the at least one parameter;
  determine whether an adjustment to the present level of the dynamic actuating current is indicated by the feed forward factor; and
  adjust the dynamic actuating current from the present level to an indicated level when an adjustment to the dynamic actuating current is indicated;
  wherein the indicated level of the dynamic actuating current is sufficient to maintain the at least one contactor in the closed state during the feed forward window;
- wherein the controller is configured to adjust the dynamic actuating current between a minimum power limit and a maximum power limit when the vehicle is in an energized condition;
- wherein the maximum power limit is less than a power rating of the at least one contactor; and
- wherein the minimum power limit is greater than a drop-out power level of the at least one contactor.

19. The vehicle of claim 18, wherein the controller is configured to adjust the dynamic actuating current by modulating the dynamic actuating current at a pulse width modulation (PWM) frequency defined by the feed forward window.

* * * * *